US010316928B2

(12) United States Patent
Yanagida et al.

(10) Patent No.: US 10,316,928 B2
(45) Date of Patent: Jun. 11, 2019

(54) VIBRATION-PROOFING DEVICE

(71) Applicant: BRIDGESTONE CORPORATION, Tokyo (JP)

(72) Inventors: Motohiro Yanagida, Tokyo (JP); Akira Ueki, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/559,288

(22) PCT Filed: Jan. 21, 2016

(86) PCT No.: PCT/JP2016/051731
§ 371 (c)(1),
(2) Date: Sep. 18, 2017

(87) PCT Pub. No.: WO2016/152223
PCT Pub. Date: Sep. 29, 2016

(65) Prior Publication Data
US 2018/0058537 A1    Mar. 1, 2018

(30) Foreign Application Priority Data
Mar. 26, 2015   (JP) ................................. 2015-064062

(51) Int. Cl.
*B60K 5/12*        (2006.01)
*F16F 15/02*       (2006.01)
(Continued)

(52) U.S. Cl.
CPC .......... *F16F 15/022* (2013.01); *B60K 5/1208* (2013.01); *B60K 5/1283* (2013.01);
(Continued)

(58) Field of Classification Search
CPC ........ F16F 7/1011; F16F 13/04; F16F 15/022; F16F 15/03; F16F 15/08; H01R 13/26;
(Continued)

(56) References Cited

U.S. PATENT DOCUMENTS 4,492,421 A * 1/1985 Ito .......................... H01B 17/30
439/271
5,324,207 A * 6/1994 Itoh ........................ H01T 13/06
439/125
(Continued)

FOREIGN PATENT DOCUMENTS

CN          1241684 A      1/2000
DE     102007038538 A1    2/2009
(Continued)

OTHER PUBLICATIONS

Communication dated Apr. 5, 2018, from the European Patent Office in counterpart European Application No. 16768126.1.
(Continued)

*Primary Examiner* — Thomas W Irvin
(74) *Attorney, Agent, or Firm* — Sughrue Mion, PLLC

(57) ABSTRACT

The present invention includes a first mounting member (11); a second mounting member (12); an actuator (14) which dampens and absorbs input vibration by reciprocally moving a movable element (13) in accordance with input vibration; an actuator case (15) which houses the actuator therein; and a relay connector (17) which is mounted on the actuator case and electrically connects the connector (16) of the actuator and an external power source. The relay connector includes a terminal (27) which connects the connector of the actuator and the external power supply, and a housing (28) in which the terminal is installed. The actuator case is formed with an insertion hole (31) through which the terminal is inserted, and a mounting cylinder (32) surrounding the insertion hole is provided to protrude from the actuator case. One of the mounting cylinder and the housing is airtightly fitted to the inside of the other thereof via a packing (35).

4 Claims, 3 Drawing Sheets

(51) Int. Cl.
*F16F 15/03* (2006.01)
*F16F 15/08* (2006.01)
*F16F 13/04* (2006.01)
*F16F 7/10* (2006.01)

(52) U.S. Cl.
CPC ............ *F16F 7/1011* (2013.01); *F16F 13/04* (2013.01); *F16F 15/03* (2013.01); *F16F 15/08* (2013.01)

(58) Field of Classification Search
CPC . H01R 13/5221; B60K 5/1208; B60K 5/1283
USPC .............. 439/89, 271, 278, 283; 267/140.11, 267/140.14
See application file for complete search history.

(56) References Cited

U.S. PATENT DOCUMENTS

| | | | | |
|---|---|---|---|---|
| 5,716,224 | A * | 2/1998 | Masuda | H01R 13/4536 439/138 |
| 6,028,523 | A | 2/2000 | Thibodeaux et al. | |
| 8,777,647 | B2 * | 7/2014 | Buehman | H01R 13/5221 439/271 |
| 8,808,026 | B2 * | 8/2014 | Yamaguchi | H01R 13/5202 439/559 |
| 2004/0266269 | A1 | 12/2004 | Miyazaki | |
| 2012/0184123 | A1 * | 7/2012 | Fukuda | H01R 13/26 439/271 |
| 2013/0328254 | A1 | 12/2013 | Kojima et al. | |

FOREIGN PATENT DOCUMENTS

| | | |
|---|---|---|
| EP | 2610522 A1 | 7/2013 |
| JP | 04121470 U | 10/1992 |
| JP | 8-138785 A | 5/1996 |
| JP | 2003109702 A | 4/2003 |
| JP | 2006-140089 A | 6/2006 |
| JP | 2007-218418 A | 8/2007 |
| JP | 2008-222073 A | 9/2008 |
| JP | 2010-255787 A | 11/2010 |
| JP | 2011-153692 A | 8/2011 |
| JP | 201242021 A | 3/2012 |

OTHER PUBLICATIONS

International Search Report for PCT/JP2016/051731 dated Mar. 1, 2016 [PCT/ISA/210].
Written Opinion for PCT/JP2016/051731 dated Mar. 1, 2016 [PCT/ISA/237].
Communication dated Sep. 26, 2018, from State Intellectual Property Office of the P.R.C. in counterpart application No. 2016800176010.

* cited by examiner

VIBRATION-PROOFING DEVICE

TECHNICAL FIELD

The present invention relates to a vibration-proofing device.

Priority is claimed on Japanese Patent Application No. 2015-64062, filed Mar. 26, 2015, the content of which is incorporated herein by reference.

BACKGROUND ART

From related art, for example, as shown in Patent Document 1 below, a vibration-proofing device which includes a first mounting member connected to one of a vibration generation unit and a vibration reception unit, a second mounting member connected to the other, an actuator which dampens and absorbs the input vibration by reciprocally moving a movable element in accordance with the input vibration, an actuator case which houses the actuator therein, and a terminal mounted on the actuator case to electrically connect a connector of the actuator and an external power supply, and in which the actuator case is formed by insert molding using the terminal as an insert product is known.

CITATION LIST

Patent Document

[Patent Document 1]
Japanese Unexamined Patent Application, First Publication No. 2010-255787

SUMMARY OF INVENTION

Technical Problem

However, in the vibration-proofing device of the related art, since the actuator case is formed by insert molding using the terminal as the insert, there is a problem of difficulty in manufacturing the actuator case.

The present invention has been made in view of such circumstances, and an object thereof is to provide a vibration-proofing device which can be easily manufactured while the sealing property inside the actuator case is maintained.

Solution to Problem

The vibration-proofing device of the present invention includes a first mounting member connected to one of a vibration generation unit and a vibration reception unit, and a second mounting member connected to the other thereof; an actuator which dampens and absorbs input vibration by reciprocally moving a movable element in accordance with input vibration; an actuator case which houses the actuator therein; and a relay connector which is mounted on the actuator case and electrically connects a connector of the actuator and an external power source. The relay connector includes a terminal which connects the connector of the actuator and the external power supply, and a housing in which the terminal is installed. The actuator case is formed with an insertion hole through which the terminal is inserted, and a mounting cylinder surrounding the insertion hole is provided to protrude from the actuator case. One of the mounting cylinder and the housing is airtightly fitted to the inside of the other thereof via a packing.

Effects of Invention

According to the present invention, it is possible to easily manufacture the actuator case while maintaining the sealing property inside the actuator case.

DESCRIPTION OF EMBODIMENTS

Figure 1:
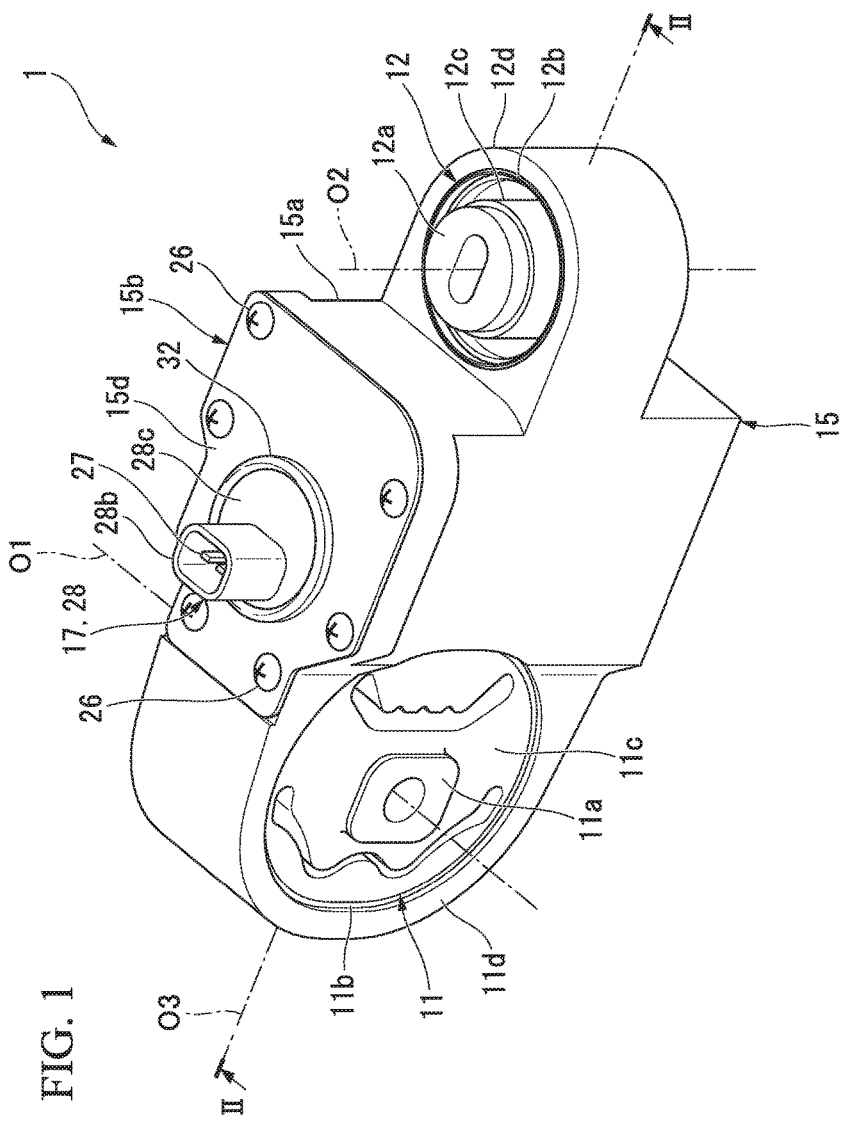
FIG. 1 is a perspective view of a vibration-proofing device shown as an embodiment according to the present invention.

Hereinafter, an embodiment of a vibration-proofing device according to the present invention will be described with reference to FIGS. 1 to 3.

The vibration-proofing device 1 includes a first mounting member 11 connected to one of a vibration generation unit and a vibration reception unit, a second mounting member 12 connected to the other, an actuator 14 for damping and absorbing the input vibration by reciprocally moving a movable element 13 in accordance with the input vibration, an actuator case 15 for housing the actuator 14 therein, and a relay connector 17 that is mounted on the actuator case 15 to electrically connect a connector 16 of the actuator 14 and an external power source (not shown).

The first mounting member 11 and the second mounting member 12 include inner cylinders 11a and 12a, outer cylinders 11b and 12b surrounding the inner cylinders 11a and 12a from outside in the radial direction, and elastic bodies 11c and 12c which connect the inner cylinders 11a and 12a and the outer cylinders 11b and 12b, respectively. The inner cylinders 11a and 12a and the outer cylinders 11b and 12b are formed of, for example, a metal material, a resin material, or the like, and the elastic bodies 11c and 12c are formed of, for example, a rubber material or the like.

The first mounting member 11 is formed to have a larger diameter than the second mounting member 12. In the shown example, the outer cylinder 11b of the first mounting member 11 is formed to have a larger diameter than the outer cylinder 12b of the second mounting member 12. The elastic body 11c of the first mounting member 11 has a larger volume than the elastic body 12c of the second mounting member 12. The spring constant of the first mounting member 11 is lower than the spring constant of the second mounting member 12.

In the first mounting member 11, each of the inner cylinder 11a, the outer cylinder 11b, and the elastic body 11c is disposed coaxially with the first central axis O1. In the second mounting member 12, each of the inner cylinder 12a, the outer cylinder 12b, and the elastic body 12c is disposed coaxially with the second central axis O2.

Further, the first central axis O1 extends parallel to an imaginary axis when the second central axis O2 is rotated 90° about a connection axis O3 which connects the first central axis O1 and the second central axis O2 and is orthogonal to both the first central axis O1 and the second central axis O2. That is, the vibration-proofing device 1 is configured so that, for example, when the first central axis O1 is disposed to extend in the horizontal direction, the second central axis O2 extends in the vertical direction.

The actuator 14 includes a support shaft 18 extending in the direction of the connection axis O3, an annular winding core 19 fitted to the support shaft 18 from the outside, two annular holders 20 that are fitted to the support shaft 18 from the outside and sandwich the winding core 19 in the direction of the connection axis O3, a coil 21 held by each holder 20, a cylindrical movable element 13 that surrounds the winding core 19 and the holder 20 over the entire circumference around the connection axis O3, a plurality of pairs of permanent magnets 23 disposed on the inner peripheral surface of the movable element 13, and an elastic support 22 that connects the movable element 13 and the support shaft 18.

Both end portions of the support shaft 18 in the direction of the connection axis O3 are fitted to the mounting holes formed in portions of the inner surface of the actuator case 15 that face each other in the direction of the connection axis O3.

The holder 20 includes an inner cylinder 20a fitted to the support shaft 18 from the outside, an outer cylinder 20b surrounding the inner cylinder 20a, and a connecting plate 20c that connects the end portions of the inner cylinder 20a and the outer cylinder 20b on the winding core 19 side.

The connector 16 for supplying power to the coil 21 is provided in the holder 20. A part of the connector 16 protrudes from the holder 20 toward the other end opening 15e of an actuator case 15 to be described later. In the holder 20, a surrounding cylinder 24 that protrudes toward the other end opening 15e of the actuator case 15 and surrounds the part of the connector 16 is provided. The surrounding cylinder 24 and the part of the connector 16 are disposed in the outer cylinder 20b of the two holders 20 located on the side of the first mounting member 11.

The movable element 13 is disposed in the actuator case 15 to be reciprocally movable so that the movable element 13 approaches one of the first mounting member 11 and the second mounting member 12 and moves away from the other. In the shown example, the movable element 13 is disposed to be reciprocally movable in the direction of the connection axis O3.

The pair of permanent magnets 23 are disposed so that the mutually opposite magnetic poles face each other across the connection axis O3. A plurality of pairs of permanent magnets 23 are arranged consecutively in the direction of the connection axis O3. In each of the permanent magnets 23 adjacent to each other in this direction, opposite magnetic poles are adjacent to each other.

The elastic support 22 is formed in an elastically deformable plate shape, and has a through-hole into which the support shaft 18 is fitted. The elastic support 22 is connected to the end portion of the movable element 13 on the side of the second mounting member 12.

The actuator case 15 connects the first mounting member 11 and the second mounting member 12. In the shown example, the respective outer cylinders 11b and 12b of the first mounting member 11 and the second mounting member 12 are fitted into the outer shells 11d and 12d, and the respective outer shells 11d and 12d are integrally formed with the actuator case 15.

The actuator case 15 is formed in a cylindrical shape having one end closed and the other end open, and includes a main body portion 15a inside of which the actuator 14 is housed, and a lid body 15b which closes the other end opening 15e of the main body portion 15a. Further, the main body portion 15a and the lid body 15b may be integrally formed.

In the shown example, the actuator case 15 is formed in a cylindrical shape extending parallel to the second central axis O2. An annular seal rubber 25 is disposed between the peripheral edge portion of the other end opening 15e of the main body portion 15a and the lid body 15b. The lid body 15b is fixed to the main body portion 15a by a plurality of screws 26.

The relay connector 17 includes a terminal 27 which connects the connector 16 of the actuator 14 and an external power source (not shown), and a housing 28 in which the terminal 27 is installed.

The housing 28 is formed in a cylindrical shape extending parallel to the second central axis O2, and the terminal 27 is formed in a rod shape extending in parallel with the second central axis O2. The housing 28 includes the inner connecting portion 28a fitted to the surrounding cylinder 24 of the actuator 14, the outer connecting portion 28b protruding outward from the actuator case 15, and a flange portion 28c located between the inner connecting portion 28a and the outer connecting portion 28b and protruding outward in the radial direction. The housing 28 is integrally formed of, for example, a thermoplastic resin or the like.

In this embodiment, the actuator case 15 is formed with an insertion hole 31 through which the terminal 27 of the relay connector 17 is inserted, and a mounting cylinder 32 surrounding the insertion hole 31 is provided to protrude.

In the shown example, an insertion hole 31 is formed in the lid body 15b. The inner connecting portion 28a of the housing 28 is inserted into the insertion hole 31, and when the inner connecting portion 28a is fitted to the surrounding cylinder 24 of the actuator 14 through the insertion hole 31, the terminal 27 is electrically connected to the connector 16 of the actuator 14.

The mounting cylinder 32 extends in parallel to the second central axis O2. A portion 15c (hereinafter referred to as an inner portion) of the lid body 15b located inside the mounting cylinder 32 protrudes to the inside of the actuator case 15 beyond a portion 15d (see the outer portion) located outside the mounting cylinder 32. Further, the inner portion 15c may protrude to the outside of the actuator case 15 beyond the outer portion 15d.

Further, one of the mounting cylinder 32 and the housing 28 is fitted to the inside of the other thereof and is airtightly fitted via an annular packing 35. In the shown example, the flange portion 28c of the housing 28 is fitted into the mounting cylinder 32 via the packing 35. Further, a cylindrical body may be disposed in the housing 28, and the mounting cylinder 32 may be fitted inside the cylindrical body.

The mounting cylinder 32 is formed in a cylindrical shape, and the packing 35 is formed in an annular shape. Therefore, it is possible to equalize the radial compression force applied to the packing 35 over the entire circumference.

An annular groove extending over the entire circumference is formed on the outer peripheral surface of the flange portion 28c, and the packing 35 is fitted into the annular groove. Therefore, it is possible to prevent the packing 35 from being misaligned with respect to the mounting cylinder 32 due to input vibration.

Further, the packing 35 is entirely covered with the mounting cylinder 32 and the flange portion 28c. Further, the packing 35 is not limited to a ring shape extending continuously over the entire circumference, but may have, be example, a ring with a C shape in which a part is cut.

The mounting cylinder 32 protrudes from both the front and back surfaces of the outer portion 15d of the lid body 15b. This makes it possible to extend the length of the mounting cylinder 32 while suppressing the amount of protrusion of the mounting cylinder 32 from the outer portion 15d of the lid body 15b and to easily enhance the rigidity of the mounting cylinder 32. Therefore, the sealing property between the mounting cylinder 32 and the housing 28 can be securely ensured.

Figure 2:
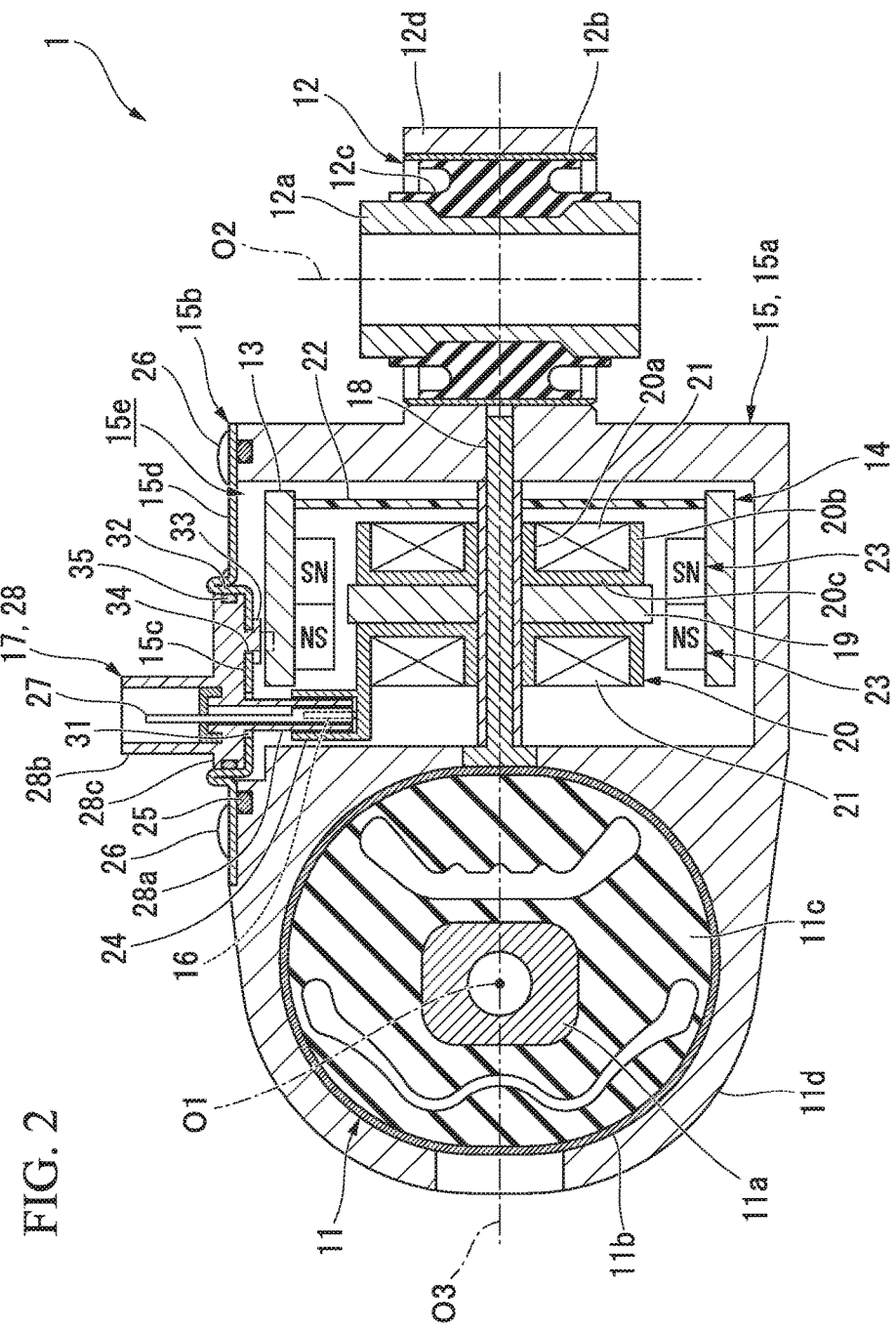
FIG. 2 is a cross-sectional view taken along line II-II of the vibration-proofing device of FIG. 1.
Figure 3:
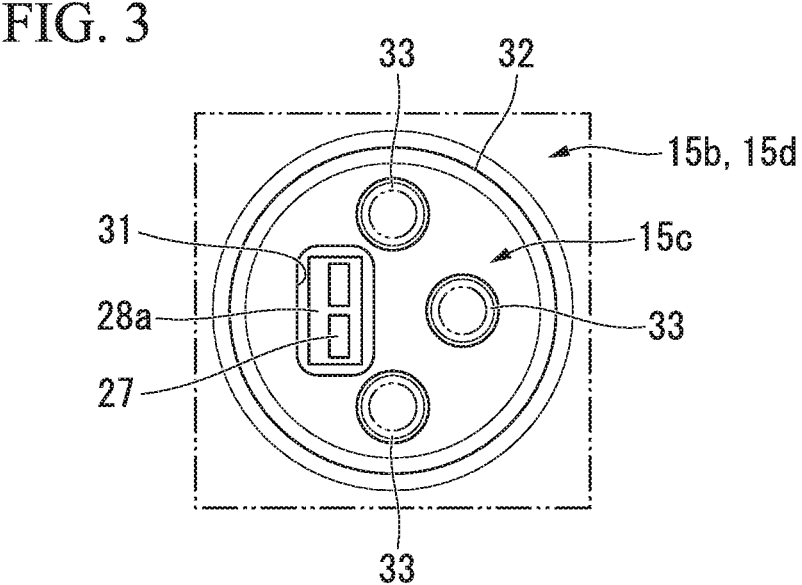
FIG. 3 is a part of a plan view of a lid body seen from the inside of the actuator case in the vibration-proofing device shown in FIGS. 1 and 2.

As shown in FIG. 2, the packing 35 is disposed on a portion of the inner peripheral surface of the mounting cylinder 32 that is located on the same plane as the front and back surfaces of the outer portion 15d of the lid body 15b. In the shown example, the mounting cylinder 32 is formed by drawing the lid body 15b. The opening peripheral edge portion of the mounting cylinder 32 in the outer portion 15d of the lid body 15b is folded back in a direction opposite to the direction in which the lid body 15b is drawn when the mounting cylinder 32 is formed.

The mounting cylinder 32 and the lid body 15b may be separate bodies. In this case, the mounting cylinder 32 and the lid body 15b may adhere or be welded together. Further, when the mounting cylinder 32 and the lid body 15b are integrated, they may be formed by casting, injection molding, or the like.

Further, a mounting hole 34 into which the fitting protrusion 33 formed in the housing 28 is fitted is formed in the inner portion 15c of the lid body 15b.

In the shown example, a plurality of fitting protrusions 33 are formed on the flange portion 28c of the housing 28 and protrude toward the inside of the actuator case 15. At first, when the fitting protrusion 33 is fitted to the mounting hole 34, as shown in a two-dot chain line in FIGS. 2, and 3, the fitting protrusion 33 has a rod shape. After fitting, among the fitting protrusions 33, the portion protruding from the back surface of the lid body 15b to the inside of the actuator case 15 is heated, is expanded by being crushed toward the back surface of the lid body 15b to form an engaging portion, and is bonded to the back surface of the lid body 15b. As a result, the flange portion 28c and the fitting protrusion 33 sandwich the inner portion 15c of the lid body 15b, thereby fixing the housing 28 to the lid body 15b. Further, the fitting protrusion 33 may not adhere to the back surface of the lid body 15b.

In the state in which the vibration-proofing device 1 is disposed on a vehicle so that vibration is input in the direction of the connection axis O3, when vibration of a frequency component incapable of being absorbed by the first mounting member 11 is input, the movable element 13 is reciprocally moved in the direction of the connection axis O3 with the amplitude and frequency calculated by control means (not shown) at the opposite phase to the input vibration. Thus, the input vibration is dampened and absorbed. Further, the vibration-proofing device 1 may be, for example, disposed on the vehicle so that the direction of the connection axis O3 coincides with the longitudinal direction of the vehicle.

Here, by mounting the large-sized first mounting member 11 on the member on the engine side and by mounting the small-sized second mounting member 12 on the member on the vehicle body side, the first mounting member 11 dampens and absorbs most of the input vibration from the engine. Therefore, it is possible to suppress the specification of the actuator 14 to the necessary minimum, and it is possible to suppress an increase in cost of the vibration-proofing device 1.

As described above, according to the vibration-proofing device 1 of the present embodiment, the housing 28 is airtightly fitted into the mounting cylinder 32 via the annular packing 35. Thus, even if the housing 28 is deformed due to vibration that is input to the vibration-proofing device 1 or displaced with respect to the actuator case 15, as long as the housing 28 is fitted into the mounting cylinder 32, it is possible to make it difficult to release the sealing property between the inner peripheral surface of the mounting cylinder 32 and the outer peripheral surface of the housing 28. Therefore, it is possible to easily and reliably prevent communication between the inside and the outside of the actuator case 15 through the insertion hole 31.

Also, by fitting the housing 28 to the inside of the mounting cylinder 32, the terminal 27 installed in the housing 28 is electrically connected to the connector 16 of the actuator 14 through the insertion hole 31. Therefore, for example, the vibration-proofing device 1 can be easily manufactured as compared with a case in which the actuator case is formed by insert molding with the terminal as the insert.

Further, since the housing 28 is disposed inside the mounting cylinder 32, it is possible to suppress the protrusion of the housing 28 from the actuator case 15. Therefore, protrusion of the vibration-proofing device 1 can be suppressed.

Further, the housing 28 is not fitted into the mounting cylinder 32, and the fitting protrusion 33 of the housing 28 is fitted into the mounting hole 34 of the actuator case 15. Accordingly, the housing 28 can be firmly fixed to the actuator case 15.

In addition, since the mounting hole 34 is located inside the mounting cylinder 32 of the actuator case 15 and is formed in a portion airtightly sealed to the outside of the actuator case 15 by the packing 35, it is possible to prevent communication between the inside and the outside of the actuator case 15 through the mounting hole 34.

Further, the technical scope of the present invention is not limited to the aforementioned embodiments, and various modifications can be made within the scope that does not depart from the spirit of the present invention.

For example, in the aforementioned embodiment, as the vibration-proofing device 1, a configuration having the first mounting member 11 and the second mounting member 12 connected via the actuator case 15 has been described. However, the present invention is not limited thereto, and the invention is also applicable to a vibration-proofing device which includes a cylindrical first mounting member, a second mounting member disposed radially inside the first mounting member, an elastic member connecting the first mounting member and the second mounting member, a movable plate defining a liquid chamber between the elastic member and the movable plate, and a movable element connected to the movable plate, and includes an actuator which excites the movable plate by reciprocally moving the movable element to dampen and absorb the input vibration, and an actuator case which houses the actuator therein.

Figure 4:
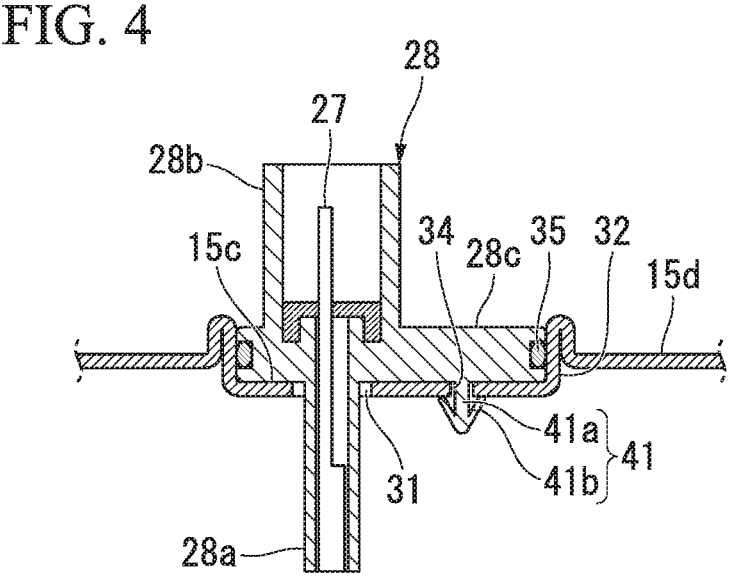
FIG. 4 is a vertical cross-sectional view of a main part of the actuator case of the vibration-proofing device shown as another embodiment according to the present invention.

Further, instead of the fitting protrusion 33, for example, as shown in FIG. 4, a fitting protrusion 41 which includes a shaft portion 41a protruding from the flange portion 28c, and a locking portion 41b formed to be elastically deformable at the distal end portion of the shaft portion 41a and gradually enlarged in diameter from the distal end toward the flange portion 28c may be adopted.

In this case, in the process of fitting the fitting protrusion 41 into the mounting hole 34 of the actuator case 15, the locking portion 41b comes into slide-contact with the opening peripheral edge portion of the mounting hole 34 in the actuator case 15 and is deformed to be reduced in diameter, and when passing through the mounting hole 34, the locking portion 41b is deformed to be restored. As a result, the flange portion 28c and the locking portion 41b of the fitting protrusion 41 sandwich the inner portion 15c of the lid body 15b, thereby fixing the housing 28 to the lid body 15b.

In addition, within the scope that does not depart from the gist of the present invention, it is possible to appropriately replace the constituent elements in the above-described embodiment with well-known constituent elements, and the above-described modification examples may be combined as appropriate.

INDUSTRIAL APPLICABILITY

According to the present invention, the device can be easily manufactured while the sealing property of the inside of the actuator case is maintained.

REFERENCE SIGNS LIST

1 Vibration-proofing device
11 First mounting member
12 Second mounting member
13 Movable element
14 Actuator
15 Actuator case
16 Connector
17 Relay connector
27 Terminal
28 Housing
31 Insertion hole
32 Mounting cylinder
33, 41 Fitting protrusion
34 Mounting hole

What is claimed is:

1. A vibration-proofing device comprising:
a first mounting member connected to one of a vibration generation unit and a vibration reception unit, and a second mounting member connected to the other thereof;
an actuator which dampens and absorbs input vibration by reciprocally moving a movable element in accordance with input vibration;
an actuator case which houses the actuator therein, and includes a main body portion and a lid body; and
a relay connector which is mounted on the actuator case and electrically connects a connector of the actuator and an external power source,
wherein:
the relay connector includes a terminal which connects the connector of the actuator and the external power supply, and a housing in which the terminal is installed,
the actuator case is formed with an insertion hole through which the terminal is inserted, and a mounting cylinder surrounding the insertion hole is provided and protrudes from the actuator case,
one of the mounting cylinder and the housing is airtightly fitted to the inside of the other thereof via a packing, and
the mounting cylinder protrudes from both front and back surfaces of an outer portion of the lid body.

2. The vibration-proofing device according to claim 1, wherein the housing is airtightly fitted to the inside of the mounting cylinder via the packing.

3. The vibration-proofing device according to claim 2, wherein a mounting hole is formed in a portion of the actuator case located inside the mounting cylinder, a fitting protrusion formed in the housing being fitted to the mounting hole.

4. The vibration-proofing device according to claim 1, wherein a mounting hole is formed in a portion of the actuator case located inside the mounting cylinder, a fitting protrusion formed in the housing being fitted to the mounting hole.

* * * * *